United States Patent [19]

Wiggins

[11] Patent Number: 4,538,185
[45] Date of Patent: Aug. 27, 1985

[54] PLATEN COVER FOR DOCUMENT BOUNDARY DETECTION IN RASTER SCANNERS

[75] Inventor: Douglas G. Wiggins, Penfield, N.Y.

[73] Assignee: Xerox Corporation, Stamford, Conn.

[21] Appl. No.: 538,037

[22] Filed: Sep. 30, 1983

[51] Int. Cl.³ .................... H04N 1/04; H04N 1/40; H04N 1/10; H04N 1/02

[52] U.S. Cl. ................................. 358/285; 358/282; 358/293; 358/294; 355/75; 355/67

[58] Field of Search ............. 358/285, 287, 293, 282, 358/294; 355/3 R, 75, 11, 67

[56] References Cited

U.S. PATENT DOCUMENTS

| | | | |
|---|---|---|---|
| 2,904,700 | 9/1959 | Rockey | 250/225 |
| 3,401,258 | 9/1968 | Guth | 362/349 |
| 3,762,813 | 10/1973 | Fowlie et al. | 355/14 |
| 4,080,634 | 3/1978 | Schreiber | 358/298 |
| 4,118,119 | 10/1978 | Maiorano | 355/11 |
| 4,366,508 | 12/1982 | Crean et al. | 358/287 |
| 4,391,505 | 7/1983 | Silverberg | 355/3 R |

Primary Examiner—Howard W. Britton
Assistant Examiner—John K. Peng
Attorney, Agent, or Firm—Frederick E. McMullen

[57] ABSTRACT

A raster input scanner having a movable carriage bearing at least one scanning array, illumination lamp, lens, and mirrors, the carriage being operatively disposed in scanning relation to a transparent glass platen on which the document original to be scanned rests, and with a platen cover for overlaying the platen and the document original thereon during scanning, the inside surface of the platen cover being corrugated and covered with a highly reflective material to expose, through specular reflection, the scanning array to intensely bright light whenever the cover inside surface is scanned enabling the boundaries of the document original to be identified and image signals not associated with the document original to be discarded.

11 Claims, 9 Drawing Figures

PLATEN COVER FOR DOCUMENT BOUNDARY DETECTION IN RASTER SCANNERS

The invention relates to raster input scanners, and more particularly, to an improved platen cover for raster input scanners enabling the position and size of the document being scanned to be reliably determined.

Raster input scanners employ one or more scanning arrays for scanning a document original and converting the document's image to electrical representations, i.e. image signals or pixels. The image signals so created may then be used to make copies or reproductions of the document and in the process may be stored, transmitted to a remote point via a suitable communication channel, etc. It is particularly important as will be understood by all familiar with this art to minimize the number of image signals insofar as possible consistent with faithful and accurate reproduction of the document in order to reduce the storage requirements and the transmission bandwidth requirements. For this purpose, numerous proposals and ideas for encoding the image signals have been propounded and tried over the years, some successfully, some not so successfully.

When scanning a document, and bearing the above in mind, it would be extremely helpful if only the document itself were to be read by the scanner array or arrays. This would then reduce the number of image signals that require processing, storage, transmission, etc. Unfortunately, documents come in all sizes and shapes and as a result do not always fit the typical raster scanner which is designed with a fixed size scan and document support platen. This results, where smaller size documents are processed by the scanner, in a more or less greater portion of the signals generated reflecting vacant areas of the platen, that is, areas of the platen not covered by the document but which are nevertheless scanned. For example, if one were to envision a postage size document set on the platen of a typical raster scanner for scanning, a substantial majority of the image signals output would represent no image at all but rather unnecessary and undesirable non-image areas of the platen.

It is with this in mind that the present invention proposes an improved platen cover for a raster input scanner for enabling the boundaries of the document being scanned to be reliably identified so as to avoid output of unnecessary image signals representing areas outside the document perimeter, the scanner having a platen for supporting the document to be scanned and at least one scanning array, comprising: a cover member, means supporting the cover member for movement into and out of overlaying relation with the platen and the document thereon, the cover member being sized to cover the platen and the document thereon on closure of the cover member, the inside surface of the cover member facing the platen being corrugated and reflective to provide a relatively coarse specular light reflecting surface which when scanned reflects a bright intense image to the scanner array permitting the document boundaries to be distinguished from the platen.

IN THE DRAWINGS

Figure 5:
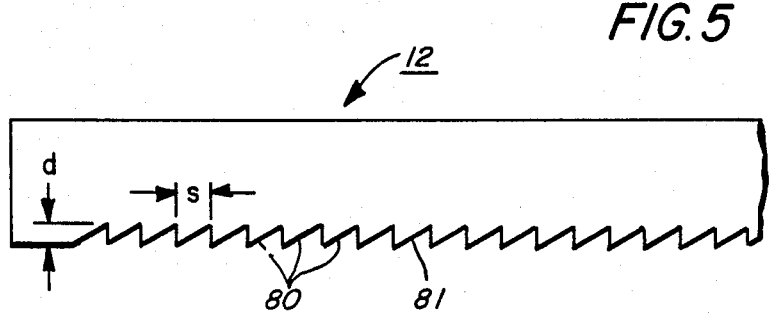
Figure 6:
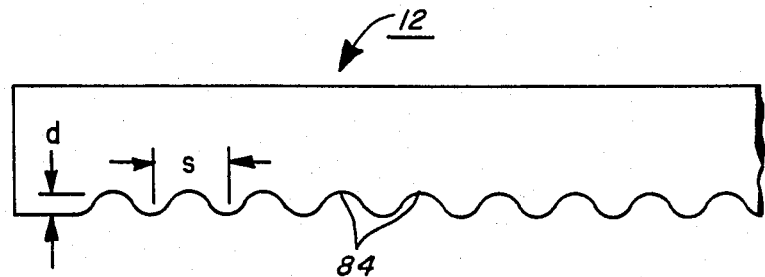
Figure 4A:
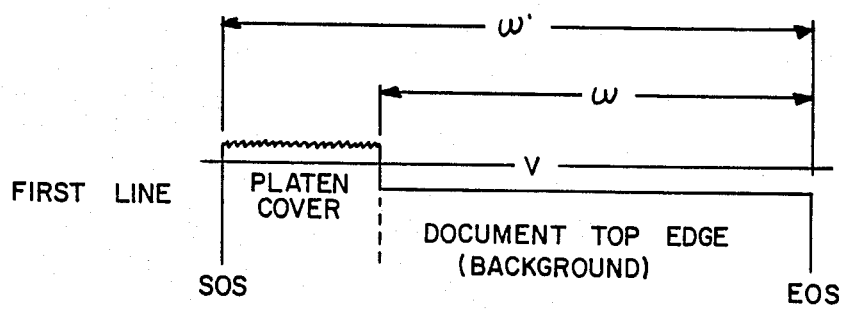
Figure 4B:
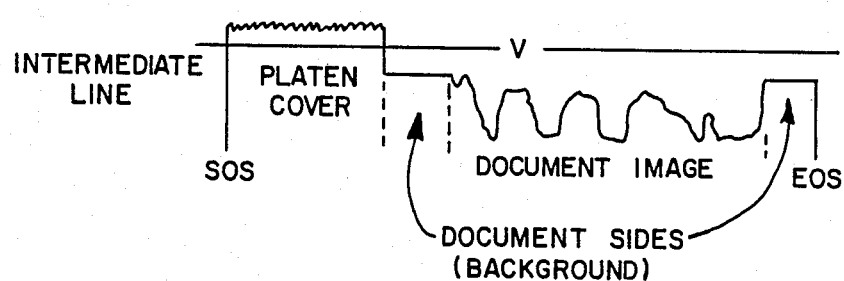
Figure 4C:
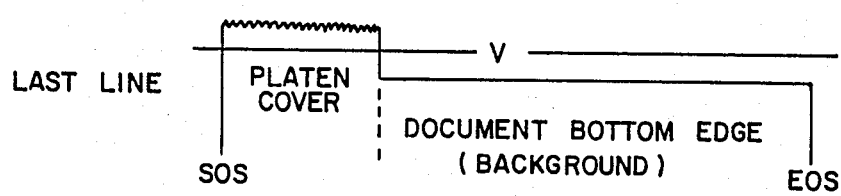
Figure 4D:
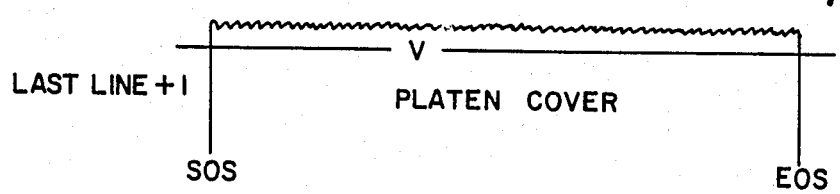

FIGS. 4a, 4b, 4c, and 4d are a series of graph-like representations of an exemplary image signal output by the scanner when scanning a first document line, an intermediate document line, a last document line, and the next line following the last document line respectively;

FIG. 5 is an enlarged fragementary view of a platen cover construction wherein the corrugations are in the form of a sawtooth; and FIG. 6 is an enlarged fragementary view of an alternate platen cover construction wherein the corrugations are in the form of a sinusoid.

For purposes of description, a raster input scanner 10 is described herein incorporating the improved platen cover 12 of the present invention.

Figure 1:
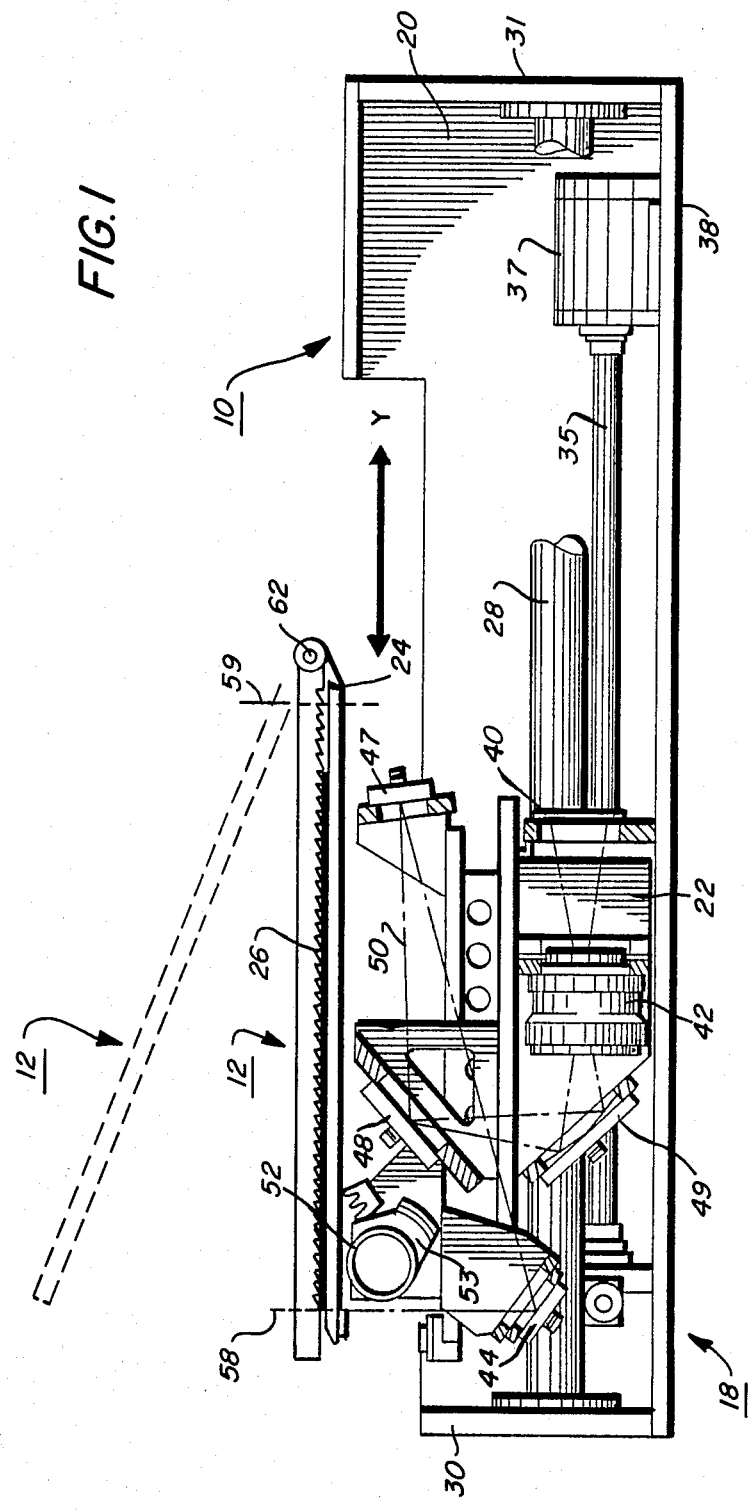
FIG. 1 is a side view in cross section depicting a raster input scanner of the type adapted to incorporate the improved platen cover of the present invention.

Referring particularly to FIG. 1, scanner 10 there shown has a suitable frame or housing 18, the walls of which cooperate to form an interior chamber or compartment 20 within which a movable scan carriage 22 is disposed. A substantial portion of the upper wall of compartment 20 is delineated by a generally rectangular transparent glass platen 24 through which the original document 26 to be scanned by scanner 10 is viewed, the document 26 to be scanned being manually placed in position on platen 24 following which platen cover 12 is closed. Following completion of the scanning cycle, cover 12 is raised and the document 26 removed.

While a manual document handling system is disclosed, it will be understood that an automatic document handler or feeder may be provided to transport the document to be scanned into scanning position on platen 24 and following scanning, to remove the document and clear platen 24. In that circumstance, the document handler itself would comprise the platen cover.

Scan carriage 22 is supported for longitudinal movement (in the Y or slow scan direction) within compartment 20 by means of a pair of spaced apart, parallel carriage support rods 28, each rod of rod pair 28 being carried in the front and rear walls 30, 31 of housing 18. Suitable bearing or journalling means (not shown) are provided to support carriage 22 for slideable scanning movement on rod pair 28 within compartment 22.

To impart scanning motion to carriage 22, a drive screw 35 is threadedly engaged with carriage 22. A reversible drive motor 37, which is supported on the base 38 of housing 18 adjacent rear wall 31, drives screw 35 in either a clockwise (i.e. scan) or counter-clockwise (return) direction to move carriage 22 longitudinally along rod pair 28. One end of drive screw 33 is carried by motor 37 while the remote end is rotatably supported in front wall 30.

A suitable scanning array 40, which may for example comprise a Fairchild Model 121 H CCD chip is supported on carriage 22. Array 40, as will be understood by those skilled in the art, comprises a series (i.e. 1728) of individual photosensitive elements effective when exposed to the document 26 being scanned to generate signals whose potential is proportional to the reflectance of the document image area seen by the array elements.

An optical system consisting of lens 42, scan mirror 44, and reflecting mirrors 47, 48, 49, cooperate to form an optical path 50 through which image rays reflected from the document 26 on platen 24 are transmitted to array 40. Lens 42 is mounted substantially centrally on carriage 22 in preset spaced opposing relation to array 40. Mirrors 47, 48, 49, which are generally rectangular in configuration, are mounted on carriage 22 in preselected angular dispositions to provide a folded optical path between platen 24 and lens 42. During scanning, image rays reflected from the document 26 on platen 24 pass downwardly to scan mirror 44 and from scan mirror 44 through mirrors 47, 48, 49 to lens 42 and array 40.

To illuminate platen 24 and the document thereon, an elongated exposure lamp 52 is provided on carriage 22. Lamp 52, which extends in the direction generally perpendicular to the direction of movement of scan carriage 22 and which provides a wedge-like beam of light extending across the width of the platen 28 (i.e. in the X or fast scan direction), is disposed in a generally cylindrical lamp housing 53. As will be understood, the dimension of the wedge-like beam of light emitted by lamp 52 is such as to illuminate at least one line of the document 26 on platen 24 so that as carriage 22 moves under platen 24, the lines of the document are illuminated in succession. The interior walls of the lamp housing 53 are preferably polished to reflect light from lamp 52 toward platen 26.

During scanning operation, carriage 22 bearing lens 42, mirrors 47, 48, 49, and exposure lamp 52 is driven by motor 37 from a home or Start Of Scan (SOS) position (indicated by the numeral 58) past platen 24 to an End Of Scan (EOS) position (identified by the numeral 59) to scan the document 26 on platen 24, scanning movement of carriage 22 being in the Y direction shown by the solid line arrow in FIG. 1. During scanning movement of carriage 22, the wedge-like beam of light from exposure lamp 52 illuminates successive lines of the document 26. The light images of the document lines are transmitted via mirrors 44, 47, 48, 49 and lens 42 to array 40 which converts the light images to image signals or pixels representative of the image grey level. Following completion of the scan, motor 37 returns scan carriage 22 to a home position preferably at a higher rate of speed.

While a stationary platen with moving scanning array has been described, it will be understood that the operating functions of platen 24 and scanning array 40 may be reversed and platen 24 moved in reciprocating fashion to provide the requisite scanning motion while array 40 (together with lens 42, mirrors 44, 47, 48, 49, and lamp 47) is stationary.

Figure 2:
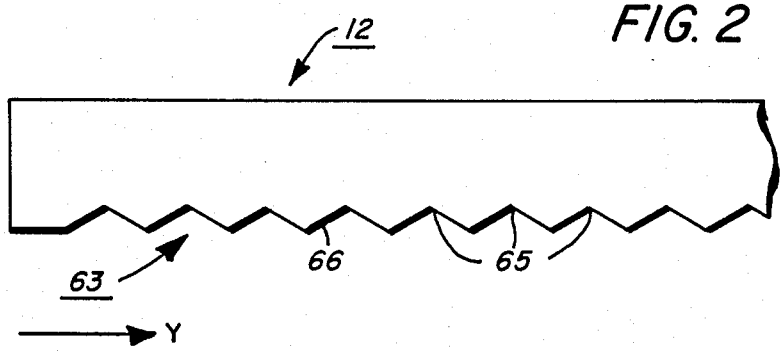
FIG. 2 is an enlarged view in cross section of the platen cover of FIG. 1 showing the corrugated inside surface of the cover.

Referring particularly to FIGS. 1 and 2, platen cover 12 comprises a substantially rectangular sheet-like rigid member pivotally supported on housing 18 of scanner 10 adjacent one edge of platen 24 by suitable pin means 62. Suitable counterbalancing means (not shown) may be provided to assist the user in opening, closing, and positioning cover 12. The length and width dimensions of cover 12 are at least equal to and preferably slightly greater than the corresponding length and width dimensions of platen 24 to assure that platen 24 is entirely covered by cover 12 when cover 12 is closed.

The inside surface 63 of cover 12 facing platen 24, and which on closing of cover 12 overlays the platen surface and any document thereon, is corrugated or rippled at 65, the longitudinal axis of corrugations 65 preferably being substantially perpendicular to the direction in which array 40 scans, i.e. perpendicular to the X axis. Preferably, a reflective covering or coating 66 is provided on the corrugated surface 63 of cover 12 to enhance the reflectivity the cover 12 and improve the detection abilities of array 40.

During scanning, with cover 12 closed to overlay platen 24 and the document 26 thereon, illumination of the corrugated surface 63 of cover 12 by scan lamp 52 produces a relatively intense and bright specular reflection which results in an image signal output by array 40 of maximum potential. Since the corrugated surface 63 of cover 12 is brighter than even the background or non-image areas of the document 26, the signal output of array 40 when scanning cover 12 directly is readily distinguishable from that of array 40 when scanning document background areas.

Figure 3:
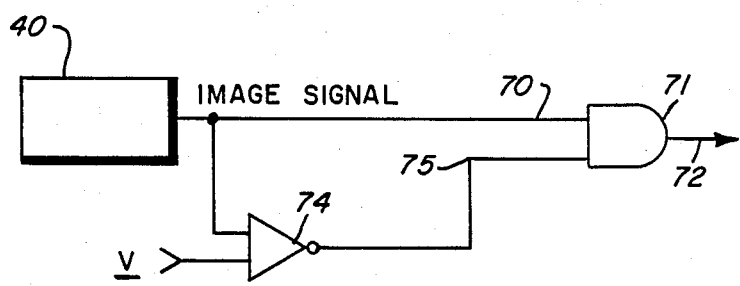
FIG. 3 is a logic schematic of a thresholding circuit for distinguishing image signals derived from the platen cover of the present invention from image signals derived from the document being scanned.

Referring to FIG. 3, the image signal output of array 40 is output through line 70 and AND function control gate 71 to image signal output line 72. Concurrently, the image signal in line 70 is fed to one input terminal of a suitable thresholder such as comparator 74. A reference signal V, representing a high level or bright white image signal, is placed on a second input terminal of comparator 74. The signal output of comparator 74 is applied through line 75 to a second input terminal of control gate 71.

During scanning, the image signals output by array 40 are thresholded by comparator 74 against the reference signal V. Where the image signal level is equal to or greater then the reference signal V, indicating that the image signals are derived from scanning the corrugated surface 63 of cover 12, the signal output of comparator 74 disables control gate 71 to prevent the output of image signals to line 72. Where the image signal level is less than the reference signal V, indicating that the image signals are derived from scanning document 26, the signal output of comparator 74 enables control gate 71 to permit the image signals to pass to image signal output line 72.

Referring particularly to FIGS. 4a-4d of the drawings, there are shown typical image signal output patterns for a document 26 whose width W in the fast scan direction X is less than the width W' of the platen 26 and whose length in the slow scan direction Y is less than the length of platen 26. It is presupposed that the document 26 of FIGS. 4a-4d is positioned on platen 26 such that the top and one side, i.e. the right side, of the document are in exact registration with the top edge and right side edge of platen 26. In that situation, since the width W of the document is less than the width W' of platen 26, an area between the opposite or left side of the document and the adjoining left side edge of platen 26 is covered directly by the corrugated surface 63 of cover 12 as is an area between the bottom of the document and adjoining bottom edge of platen 26. As can be seen from drawing FIGS. 4a-4d, the signal output of array 40 when scanning the corrugated surface 63 of platen cover 12 directly is substantially higher than when scanning the whitest portions of the document, i.e. the document top, side, and bottom margins. This permits the position and size of the document 26 on platen 24 to be readily identified.

Referring particularly to FIGS. 5 and 6, specific design configurations for the corrugated surface 63 of cover 12 are there shown. In FIG. 5, the corrugations 80 are sawtooth in shape. Preferably, the dimensions of sawtooth corrugations 80 are such as to provide a reflective surface 81 having a slope of between 7° and 16°.

One particular sawtooth corrugation for this purpose has a depth d of 0.005 in. with a span s of 0.030 in. between the teeth at the tooth peak.

In the FIG. 6 embodiment, the corrugations 84 are sinusoidal in shape. One particular sinusoidal corrugation has a depth d of 0.002 in. with a span or pitch of 0.035 inches.

While cover 12 has been illustrated as a unitary rigid member with the inside surface 63 corrugated, other constructions may be envisioned as for example a cover comprised of an assembly of parts with the surface of the cover part or parts facing platen 24 being corrugated, or a cover composed of a flexible or elastic material having the inside surface corrugated. The corrugated surface of cover 12 may be formed in any suitable way such as by casting, machining, etc., and from various materials such as plastic, metal, etc. Where the material forming the inside corrugated surface of the cover is itself reflective, the reflective coating 66 may be dispensed with and the reflective nature of the cover material relied upon instead. Reflective coating 66 may comprise any suitable material such as paint, tape, vacuum deposited aluminum, nickel, chrome, etc.

Other shapes and configurations for corrugations 65 may be contemplated. And, while the axis of the corrugations have been shown and described herein as being substantially perpendicular to the fast scan axis X, other angular relationships between the axis of the corrugations on platen cover 12 and the fast scan axis X may be envisioned. Further, a circular or semi-circular corrugated pattern may be contemplated instead of axial corrugated patterns.

While invention has been described with reference to the structure disclosed, it is not confined to the details set forth, but is intended to cover such modifications or changes as may come within the scope of the following claims.

I claim:

1. In a raster input scanner having a platen for supporting the document to be scanned and at least one scanning array for scanning the document image to produce image signals of varying potentials representative of the document image for output, the combination comprising:
   (a) a cover member; and
   (b) means supporting said cover member for movement into and out of overlaying relation with said platen and the document thereon,
   said cover member being sized to cover said platen on closure of said cover member,
   the inside surface of said cover member facing said platen being corrugated and reflective to provide a relatively coarse specular light reflecting surface which when scanned reflects a relatively bright intense image distinguishable from the document image;
   said scanning array producing image signals of maximum potential when scanning said cover specular reflective surface; and
   (c) control means for controlling the output of image signals to avoid output of unnecessary image signals representing areas outside the document perimeter, including
   means establishing a preset reference potential greater than the image signal potentials produced by scanning said document image but less than the maximum potential produced by scanning said cover specular light reflecting surface, and
   means for preventing output of image signals when the image signal potential is above said preset reference signal potential.

2. The scanner according to claim 1 in which said corrugated inside surface is covered with a light reflecting material to provide said reflective cover surface.

3. The scanner according to claim 1 in which said cover member is comprised of a rigid material.

4. The scanner according to claim 1 in which said cover member is comprised of a flexible material.

5. The scanner according to claim 1 in which the corrugations on said cover member inside surface are in the shape of a sawtooth wave.

6. The scanner according to claim 1 in which the corrugations on said cover member inside surface are in the shape of a sinusoidal wave.

7. The scanner according to claim 1 in which the corrugations on said cover member inside surface are in the shape of a triangle.

8. In a raster input scanner adapted to scan a document and to output image signals representative of the document image scanned, the scanner having lamp means for illuminating at least a line-like portion of said platen and the document thereon, at least one scanning array adapted to scan at least one line at a time, optical means for transmitting light rays from said illuminated line to said array, and drive means for effecting relative scanning movement between said scan means and said platen to enable said array to scan said platen and the document thereon line by line, the combination comprising:
   (a) a sheet-like member having dimensions at least equal to the dimensions of said platen;
   (b) said member being supported for movement into and out of overlaying closing relation with said platen and said document;
   (c) the surface of said member facing said platen being rippled; and
   (d) a specularly light reflective covering on said member rippled surface and cooperable with said rippled surface when illuminated by said lamp means to generate light rays having an intensity greater than the intensity of the light rays from the document being scanned whereby the image signals produced by said scanning array when scanning said member specularly light reflective covering are distinguished from the image signals produced by said scanning array when scanning the document image; and
   (e) means responsive to image signals produced by said scanning array when scanning said member specularly light reflective covering to prevent the output of said image signals by said scanner.

9. The scanner according to claim 8 in which said member surface has a sawtooth contour.

10. The scanner according to claim 8 in which said member surface has a sinusoidal contour.

11. The scanner according to claim 8 in which the axis of the ripples in said member surface are perpendicular to the scanning axis of said array.

* * * * *